United States Patent
Benckenstein, Jr. et al.

(10) Patent No.: US 7,274,170 B2
(45) Date of Patent: *Sep. 25, 2007

(54) BATTERY PACK CONTROL MODULE

(75) Inventors: Claude Leonard Benckenstein, Jr., Sugar Land, TX (US); David Allen White, Houston, TX (US)

(73) Assignee: SouthWest Electronic Energy Corporation, Stafford, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 11/293,433

(22) Filed: Dec. 2, 2005

(65) Prior Publication Data

US 2007/0126400 A1   Jun. 7, 2007

(51) Int. Cl.
*H01M 10/46* (2006.01)
(52) U.S. Cl. .................................................... 320/119
(58) Field of Classification Search ........ 320/116–121, 320/123, 150, 163; 307/66
See application file for complete search history.

(56) References Cited

U.S. PATENT DOCUMENTS

| | | | | |
|---|---|---|---|---|
| 3,816,805 A | * | 6/1974 | Terry | 320/123 |
| 3,886,426 A | * | 5/1975 | Daggett | 320/117 |
| 4,851,756 A | | 7/1989 | Schaller et al. | 320/126 |
| 5,332,927 A | * | 7/1994 | Paul et al. | 307/66 |
| 5,461,264 A | | 10/1995 | Yang | 307/81 |
| 5,479,083 A | * | 12/1995 | Brainard | 320/121 |
| 5,619,417 A | | 4/1997 | Kendall | 702/63 |
| 5,736,833 A | * | 4/1998 | Farris | 320/163 |
| 5,900,717 A | * | 5/1999 | Lee | 320/150 |
| 5,973,476 A | * | 10/1999 | Irvin | 320/112 |
| 6,037,750 A | | 3/2000 | Von Novak | 320/132 |
| 6,437,539 B2 | | 8/2002 | Olsson | 320/118 |
| 6,806,686 B1 | * | 10/2004 | Thrap | 320/118 |
| 6,844,703 B2 | | 1/2005 | Canter | 320/131 |
| 6,873,134 B2 | | 3/2005 | Canter | 320/118 |
| 2003/0214267 A1 | * | 11/2003 | Long | 320/116 |
| 2005/0275372 A1 | | 12/2005 | Crowell | 320/112 |

FOREIGN PATENT DOCUMENTS

EP   1220414   *   7/2002

OTHER PUBLICATIONS

DelRossi, Rich; "Cell Balancing Design Guidelines"; Microchip Technology, 2002. pp. 1-13.

* cited by examiner

*Primary Examiner*—Edward H Tso
(74) *Attorney, Agent, or Firm*—Buskop Law Group, PC; Wendy Buskop

(57) ABSTRACT

A battery pack control module for balancing a plurality of cells or groups of cells connected in series includes a controller assembly, a disconnect circuit, a pack sensing circuit, a balancing circuit, and computer instructions for instructing the controller assembly to control the disconnect circuit and the balancing circuit. The disconnect circuit engages the controller assembly and a plurality of cells or groups of cells connected in series. The pack sensing circuit connects to the controller assembly and the plurality of cells or groups of cells connected in series. The balancing circuit connects between the plurality of cells or groups of cells connected in series, and engages the controller assembly. The plurality of cells or groups of cells connected in series is balanced when the battery pack control module operates in a charging phase, a discharging phase, a quiescent phase, or a storage phase.

20 Claims, 6 Drawing Sheets

BATTERY PACK CONTROL MODULE

FIELD

The embodiments relate to battery pack control modules for balancing a plurality of cells or groups of cells connected in series and in parallel to form a battery pack system for use in various applications such as transportation, communication, oil and mineral exploration, oceanographic research and monitoring, pipeline monitoring and maintenance, various medical applications, and various portable applications including military applications.

BACKGROUND

Lithium ion battery technology is becoming the standard for rechargeable energy storage systems. Lithium ion batteries are able to store up to three to four times as much electric energy as currently used rechargeable batteries.

However, current lithium ion battery pack balancing technology has the disadvantage that it requires complex and costly electronic control and balancing circuitry that may be inactive for long periods of time.

Accordingly, there exists a need for a battery pack control module which can continuously balance cells using continuously active control circuits.

Currently, balancing the capacities of series connected lithium ion cells in a battery pack system is accomplished using resistors connected by switches across each cell combined with cell voltage monitoring and computer control. The resistors dissipate a relatively small amount of power and are activated infrequently. Large battery packs with multiple sources of differential leakage currents cause the battery pack capacity to diminish and not be available for rapid use at all times.

A need exists for a battery pack control module to continuously minimize the loss of capacity that occurs in large lithium ion battery pack systems.

The present embodiments address these needs.

BRIEF DESCRIPTION OF THE DRAWINGS

The detailed description will be better understood in conjunction with the accompanying drawings as follows.

Figure 1:
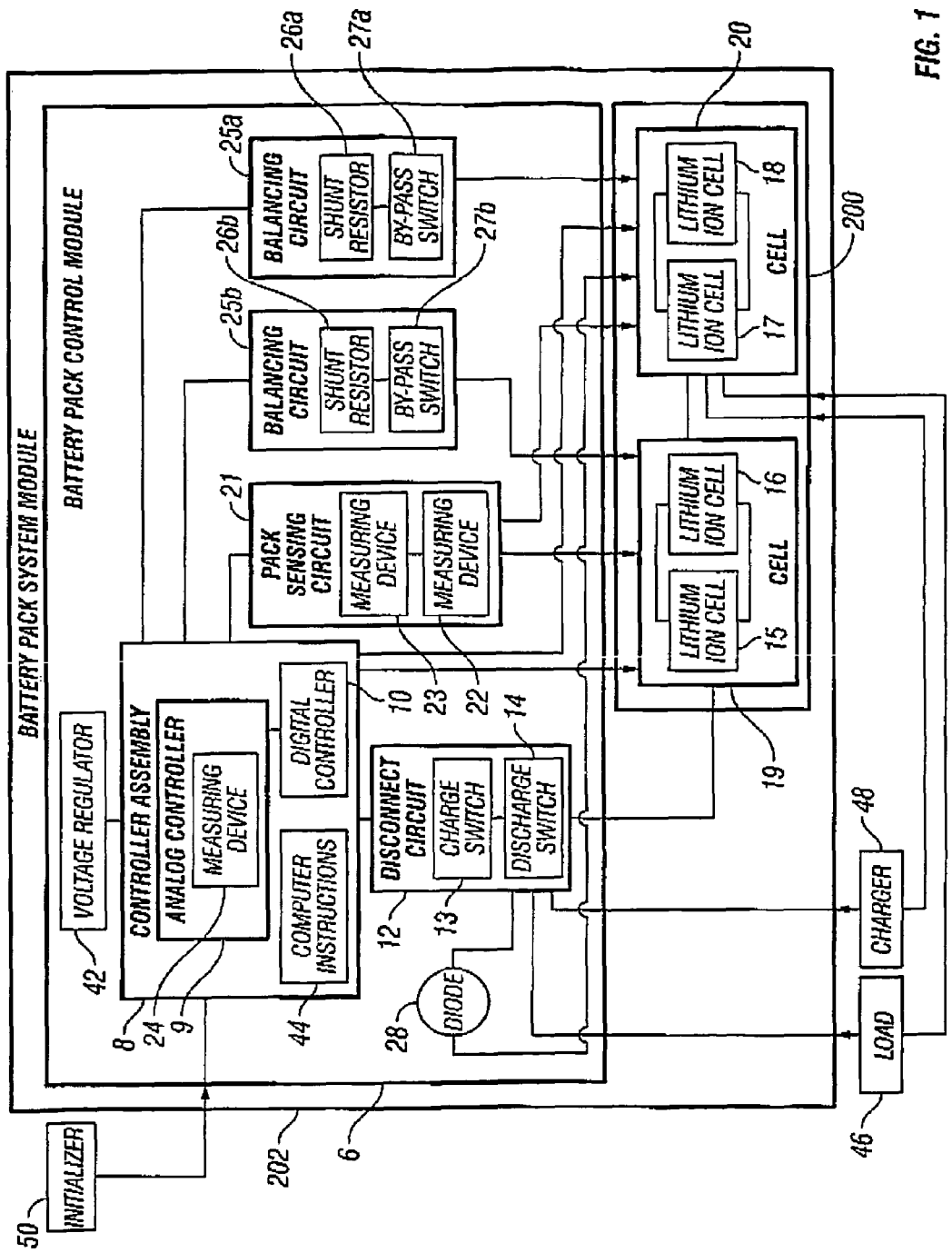
FIG. 1 depicts a battery pack control module for balancing lithium ion cells using a reverse voltage protection diode.

The present embodiments are detailed below with reference to the listed Figures.

DETAILED DESCRIPTION OF THE EMBODIMENTS

Before explaining the embodiments in detail, it is to be understood that the embodiments are not limited to the particular description, and that they can be practiced or carried out in various ways.

Cell balancing incorporated with protection circuits have only been available for 4 series lithium ion cells. Traditionally, balancing is only accomplished during the charge phase. The embodiments address cell balancing in any one of four states, which include quiescent, charge, discharge and storage.

The battery pack control module extends the power duration of battery packs of lithium ion cells to create high energy per ounce battery packs with a longer life in comparison to lead acid or other rechargeable batteries. Lithium ion cells and lithium ion battery packs are highly desirable as a source of power because of their high energy capacity, low weight, small size, and potential for long life. The present embodiments should also work with various types of battery systems.

The battery pack control module enables lithium ion battery pack systems to be balanced at all times or continuously balanced, thereby extending the life cycle of the lithium ion cells or groups of lithium ion cells. The battery pack control module enables minimal loss of capacity of the battery pack system while providing a light weight, continuously balanced battery pack. The present embodiments should enable the balancing of other types of battery systems.

The battery pack control module causes improved power duration for balanced lithium ion cells or groups of lithium ion cells connected in series, or connected in parallel and in series.

The battery pack control module monitors and measures parameters for a plurality of lithium ion cells connected in parallel or groups of lithium ion cells connected in parallel and in series. The battery pack control module is used to determine the relative state of charge for individual lithium ion cells connected in parallel or for groups of lithium ion cells connected in parallel and in series.

To balance the cells or groups of cells, the battery pack control module removes at least a portion of a charge of a cell or groups of cells to achieve a balanced state of charge for the plurality of individual lithium ion cells connected in series, or groups of lithium ion cells connected in parallel and in series, even if the cells are in a discharge phase, a charge phase, a quiescent phase, a storage phase, or combinations of these conditions.

The battery pack control module for balancing a plurality of cells or groups of cells connected in series can include a controller assembly including an analog controller and a digital controller; a disconnect circuit, with a charge switch and a discharge switch connected in series, engaging the controller assembly and the plurality of cells or groups of cells connected in series; a pack sensing circuit with means for measuring battery pack control module temperature, means for measuring battery pack control module current, means for measuring cell voltages, or possibly combinations thereof.

The pack sensing circuit connects to the controller assembly and the plurality of cells or groups of cells connected in series. A balancing circuit with a shunt resistor connected to a by-pass switch is used wherein the balancing circuit connects between the plurality of cells or groups of cells connected in series and engages the controller assembly. The battery pack control module also includes computer instructions for instructing the controller assembly to control the disconnect circuit and the balancing circuit. The battery pack control module continuously balances the plurality of lithium ion cells or groups of lithium ion cells connected in parallel and in series even if the battery pack is in a charging phase, a discharging phase, a quiescent phase, or a storage phase.

With reference to the figures, FIG. 1 depicts a battery pack control module 6 with protective circuitry that includes a reverse voltage protection diode 28. The reverse voltage protection diode 28 connects to a disconnect circuit 12, as well as a group of cells connected in series 20.

The battery pack control module 6 includes a controller assembly 8 connected to the disconnect circuit 12. The controller assembly 8 can communicate with the voltage regulator 42, a monitor or initializer 50, a balancing circuit 25a and 25b, and a pack sensing circuit 21. A device for measuring for measuring cell voltage 24 can be used within the controller assembly 8.

The controller assembly 8 connects to the series connected groups of cells connected in parallel 19 and 20. If the device for measuring cell voltage 24 is outside of the controller assembly 8, the pack sensing circuit 21 connects directly to the series connected groups of cells connected in parallel 19 and 20, and the controller assembly 8 does not have to connect directly to the series connected groups of cells connected in parallel 19 and 20.

The controller assembly 8 can include an analog controller 9 and a digital controller 10. The controller assembly 8 can include a reverse voltage protection diode 28 to prevent excessive voltage from developing across the controller assembly 8, the voltage regulator 42, and the disconnect circuit 12.

An exemplary analog controller 9 can be one available from Texas Instruments of Dallas Tex., Part Number BQ29312A.

An exemplary digital controller 10 can be circuitry that includes one or more analog I/O ports, one or more digital I/O ports, a processor, which could be a microprocessor, memory which can be a flash memory having processing logic in the memory, and additional computer instructions in the memory for directing the processor.

The digital controller has at least one configuration table. The configuration table can be a table, groups of tables, or can be programmable data about the cells to be balanced. Additional data storage can be used in communication with the processor for storing the configuration table, as well as storing computer instructions for operating the circuitry of the balancing circuit and for storing additional data related to the configuration table. The data storage can include the monitored and measured data obtained by the battery pack control module, such as cell voltage, current and/or temperature. The monitored and measured data can be recorded and stored in a database format or a table format.

Disconnect circuit 12 can include a charge switch 13 and a discharge switch 14 connected in series. The charge switch 13 can be a transistor switch such as a Vishay P-FET switch of Malvern, Pa. The discharge switch 14 can be the same part as the charge switch or a similar type of switch.

A lithium ion cell 15 can be connected in parallel to a lithium ion cell 16. A lithium ion cell 17 can be connected in parallel to a lithium ion cell 18. A plurality of lithium ion cells 19 connected in parallel can be connected in series to a plurality of lithium ion cells connected in parallel 20. A plurality of parallel-connected lithium ion cells 19 and 20 can be connected as groups in series 200.

In this embodiment, balancing circuits 25a and 25b can be used. Each balancing circuit 25a and 25b can include shunt resistors, 26a and 26b respectively, and bypass switches 27a and 27b respectively.

In an embodiment, the shunt resistor can be used across groups of cells connected in parallel through the bypass switch.

The pack sensing circuit 21 can be used to measure any combination of cell voltages in groups of cells in series. The pack sensing circuit 21 can also be used to measure temperatures of a cell, temperatures of groups of cells, or temperatures between groups of cells. The pack sensing circuit 21 can be used to measure in groups of cells in series 200. The pack sensing circuit also has a device for measuring cell voltages 24 between cells, between groups of cells or combinations thereof. One or more current measuring, cell voltage measuring and/or temperature measuring devices can be used in the embodiments.

Continuing with FIG. 1, the device for measuring cell voltages 24 between cells, between groups of cells or combinations thereof, can be internal to the analog controller 9. The means for measuring cell voltages can be within the analog portion of the controller assembly 8. An example of a device usable for measuring cell voltages could be a Texas Instrument analog controller that additionally measures voltage, which is available from Texas Instruments of Dallas, Tex.

The pack sensing circuit 21 can include a device for measuring battery pack temperature 22, which can be external to the controller assembly 8. This temperature sensing device can be any thermistor, such as those from CTS of Elkhart, Ind.

The pack sensing circuit 21 of FIG. 1 includes a device for measuring battery pack current 23 which can be external to the controller assembly 8. The device for measuring battery pack current can be a resistor, such as those available from Vishay of Malvern, Pa.

The balancing circuits 25a and 25b include shunt resistors 26a and 26b connected to a by-pass switches 27a and 27b. The by-pass switch 27a or 27b can be a semiconductor switch, a variable resistor, a mini-micro switch or combinations of these devices. The balancing circuits 25a and 25b can be used to connect between the plurality of cells 15, 16, 17, and 18 or between the groups of parallel connected cells 19 and 20 which can be connected in series 200. The controller assembly 8 can activate balancing activity by engaging or controlling the balancing circuits 25a and 25b.

Computer instructions 44 can be used with the controller assembly 8 to direct the controller assembly 8 to activate disconnect circuit 12 to disconnect cells from a load 46 or a charger 48 and thereby enhancing the balancing of the groups in series 200, and for battery pack system module 202 safety.

The computer instructions 44 can be stored in the memory of a processor of a computer or server usable in the embodiments, which can include instructions to initialize and control the analog controller 9 for battery pack system module 202 safety and to enable or disable individual balancing circuits 25a and 25b at anytime, to keep groups of cells in series 200 continuously in balance.

The embodiments contemplate using a battery pack control module 6 with a voltage regulator 42 for powering the controller assembly 8. The voltage regulator 42 can be a DC programmable voltage regulator such as those made by Linear Technology, Inc. of Malpitas, Calif.

The embodiments contemplate that a monitor or initializer 50 can be connected to the controller assembly 8, such as the type made by Hewlett Packard of Palo Alto, Calif.

A load 46, which is also referred to herein as an application, can be connected to a battery pack system module 202. A charger 48 can be connected to the battery pack system module 202. In FIG. 1, a line is depicted around battery pack control module 6 with the plurality of cells connected in parallel, further connected in series 200, which is hereafter termed "a battery pack system module 202."

Figure 2:
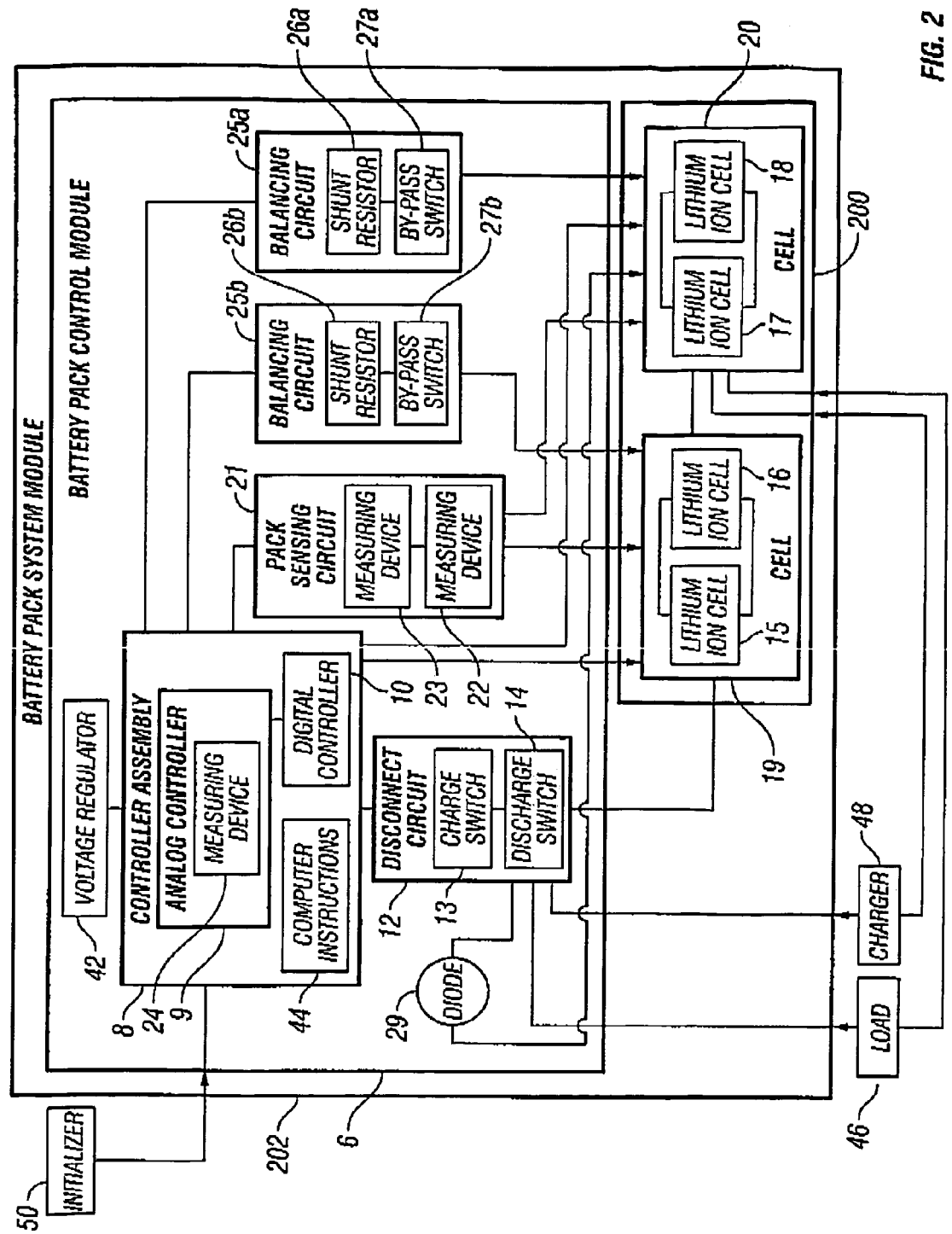
FIG. 2 depicts a battery pack control module for balancing lithium ion cells using a bypass diode.

FIG. 2 depicts an alternative embodiment to that shown in FIG. 1. In FIG. 2, a bypass diode 29 is used instead of a reverse voltage protection diode 28. Bypass diodes are available from ON Semiconductor of Phoenix, Ariz., and Vichay of Malvern, Pa.

Figure 3:
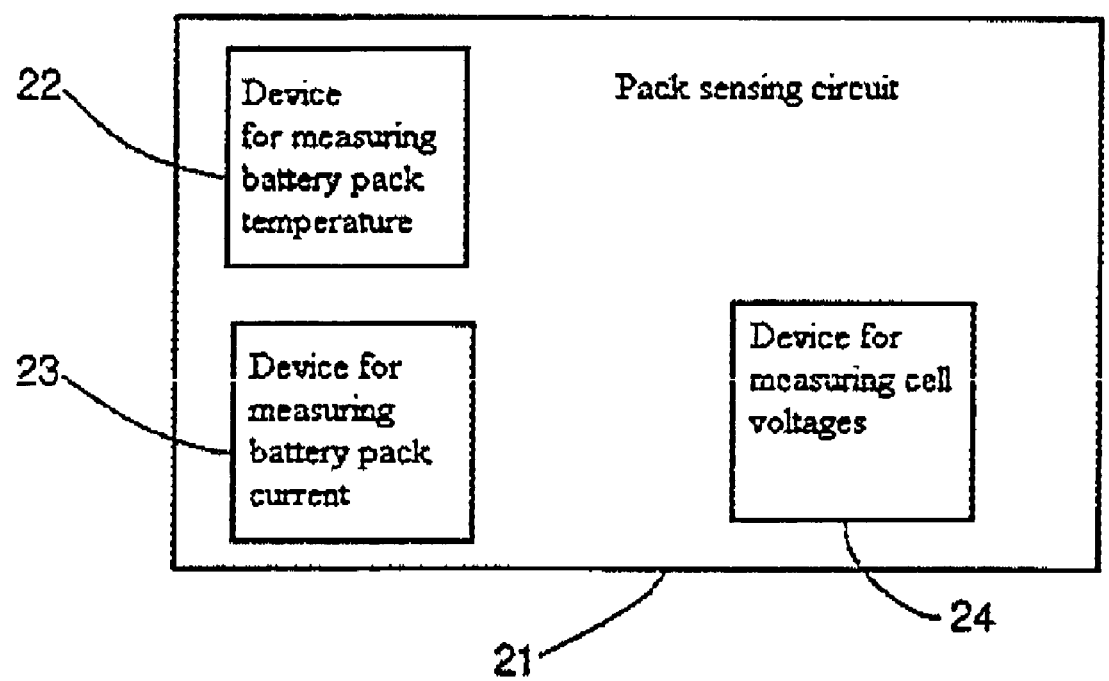
FIG. 3 depicts a pack sensing circuit usable in the battery pack control module.

FIG. 3 provides a detailed view of a pack sensing circuit 21 usable in an embodiment. The pack sensing circuit 21 of FIG. 3 is shown with a device for measuring battery pack temperature 22, a device for measuring battery pack current 23, and a device for measuring cell voltages 24.

Figure 4:
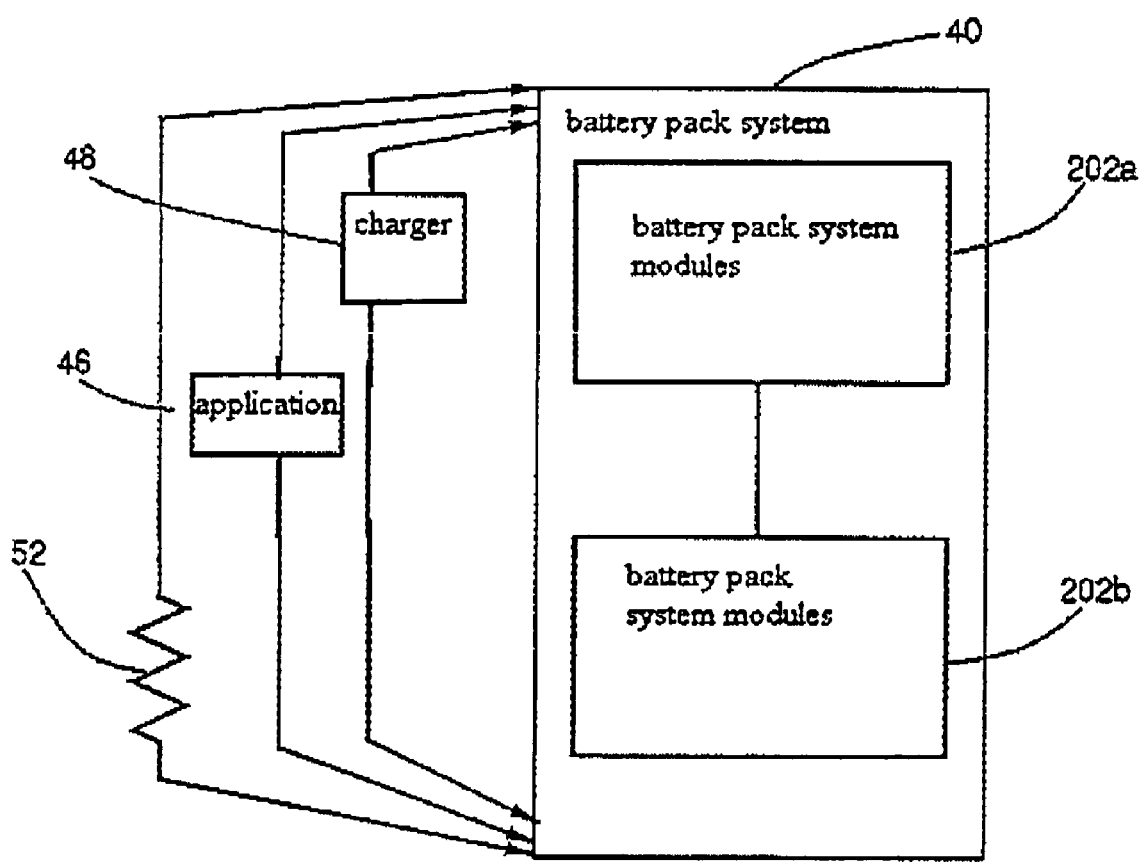
FIG. 4 depicts a battery pack system with battery pack control modules connected to cells connected in series.

FIG. 4 depicts a detailed view of a battery pack system 40. The battery pack system 40 depicts a plurality of at least two battery pack system modules shown connected in series as elements 202a and 202b to form a battery pack system 40. The battery pack system modules 202a and 202b typically have the same number of groups of cells connected in parallel but need not contain the same number of these parallel groups connected in series. The plurality of cells or groups of cells are lithium ion cells, such as those sold through Southwest Electronic Energy Corporation of Houston, Tex.

FIG. 4 shows an application 46 connected to a battery pack system 40 and a charger 48 connected to the battery pack system 40. A discharge resistor 52 is depicted connected to the battery pack system 40. Discharge resistors are available from Vishay of Malvern, Pa.

The embodiments contemplate balancing the state of charge of at least two battery pack system modules connected in series 202a and 202b by discharging the battery pack system 40 using a discharge resistor 52 until a balanced state is achieved. The bypass diode 29 shown in FIG. 2 that is contained within each battery pack system modules 202a, 202b facilitate the balancing of these two series connected battery pack system modules.

The battery pack system modules 202a and 202b are contemplated to be available for use anytime, even if the battery pack system 40 has been in an idle state, a discharge state, a quiescence state or in storage, which can be long term storage. The battery pack system modules 202a and 202b can be individually available for use at full capacity any time due to the internal balancing circuit shown in FIG. 1 and FIG. 2. Alternatively, if the battery pack system 40 contains battery pack system modules 202a and 202b that are not balanced, the battery pack system 40 will require the discharge balancing described above before the battery pack system 40 is available at full capacity.

Figure 5A:
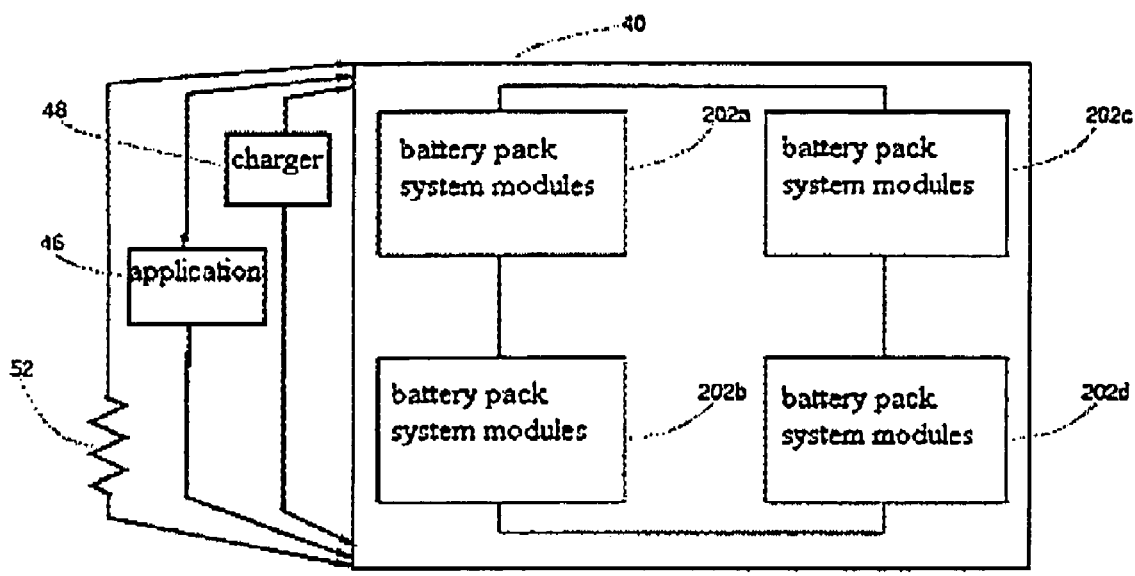
FIG. 5a depicts battery pack systems containing battery pack control modules connected in parallel and then in series.
Figure 5B:
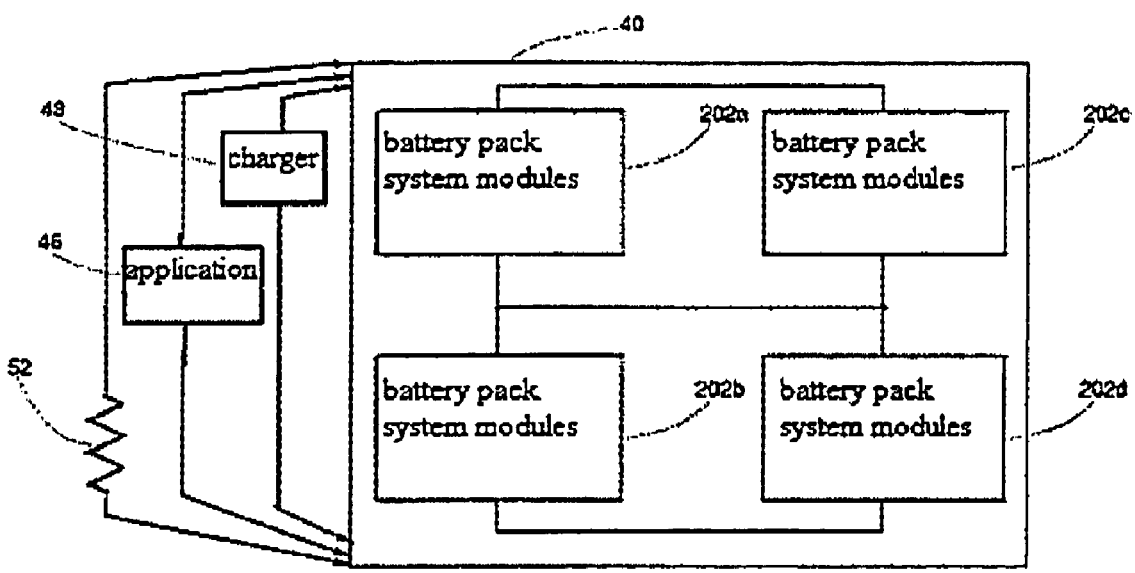
FIG. 5b depicts battery pack systems containing battery pack control modules connected in parallel and then in series with internal nodes connected.

FIG. 5a depicts a plurality of battery pack systems containing at least two battery pack system modules that are connected both in parallel and in series 202a, 202b, 202c, and 202d. FIG. 5b depicts an alternate arrangement of the elements in FIG. 5b wherein internal nodes are connected. All of the battery pack system modules 202a, 202b, 202c, and 202d of both FIGS. 5a and 5b can be balanced using the embodied methods.

The embodiments monitor and measure cell voltages for lithium ion cells or groups of lithium ion cells using the sensing circuit. The sensing circuit can include thermistors, comparitors, resistors, voltage translators and similar components for sensing temperature, voltage and current. The measured data is stored in the digital controller previously noted in FIG. 1.

Data from a configuration table is used to customize the battery pack system module 202 for the cells or groups of cells 19 and 20 to which the battery pack system module is connected, the groups of cells 19 and 20 are shown in FIG. 1. The configuration table is additionally used to customize the battery pack system module 202 for the application 46 and the charger 48 attached to it, even when multiple battery pack system modules 202a, 202b are connected in a battery pack system 40 shown in FIG. 4, FIG. 5a, and FIG. 5b.

The configuration table contains data on the cells or groups of cells 19 and 20 on the application 46 and on the battery charger 48. The configuration table data is stored in data storage connected to a processor or stored in memory of a processor. The data contained therein relate to the specifications of the cells or groups of cells connected to the battery pack system module, application specifications, and charger specifications. An example of the specifications usable in the configuration table would be Sanyo specifications that describe a particular group of Sanyo cells used in the groups of cells in series. Another example of the specifications usable in the configuration table is data on the characteristics of cells obtained from tests and research.

The specifications can include data such as the capacity ranges of the cells, the temperature limits of the cells, or the range of currents of the cells or another limit of the cell, such as maximum balancing voltage differentials and voltage ranges to which the cell can be charged as charger specifications are changed. Other data includable in the configuration table can be specifications on the application or charger to which the battery pack is to be applied, procedures for charging the battery pack, communication protocol with the charger and application, the environment for battery pack operation, and maximum application limits.

The embodiments can be used to make sure the current through the cells is not excessively high. The embodiments can be used to make sure the voltage across the cells is not excessively high, or low. The embodiments can be used to control excessive temperatures across the cells connected in series by disconnecting the application 46 or the charger 48, thus insuring that the temperatures are not driven too high and the cells or groups of cells 19 and 20 are not used or charged when temperature is too low.

Additionally, the embodiments contemplate providing data to a user interface, such as a graphics user interface (GUI), which indicates that the temperature across the cells or groups of cells is too high and permits user intervention. If a GUI is used, the GUI can display multiple parameters, such as temperature, voltage, current, and computed data (for example, capacity, time to empty, time to full, balance status, and the like). These example parameters can be captured or calculated at a future time and most are Smart Battery (SMB) parameters.

Figure 6:
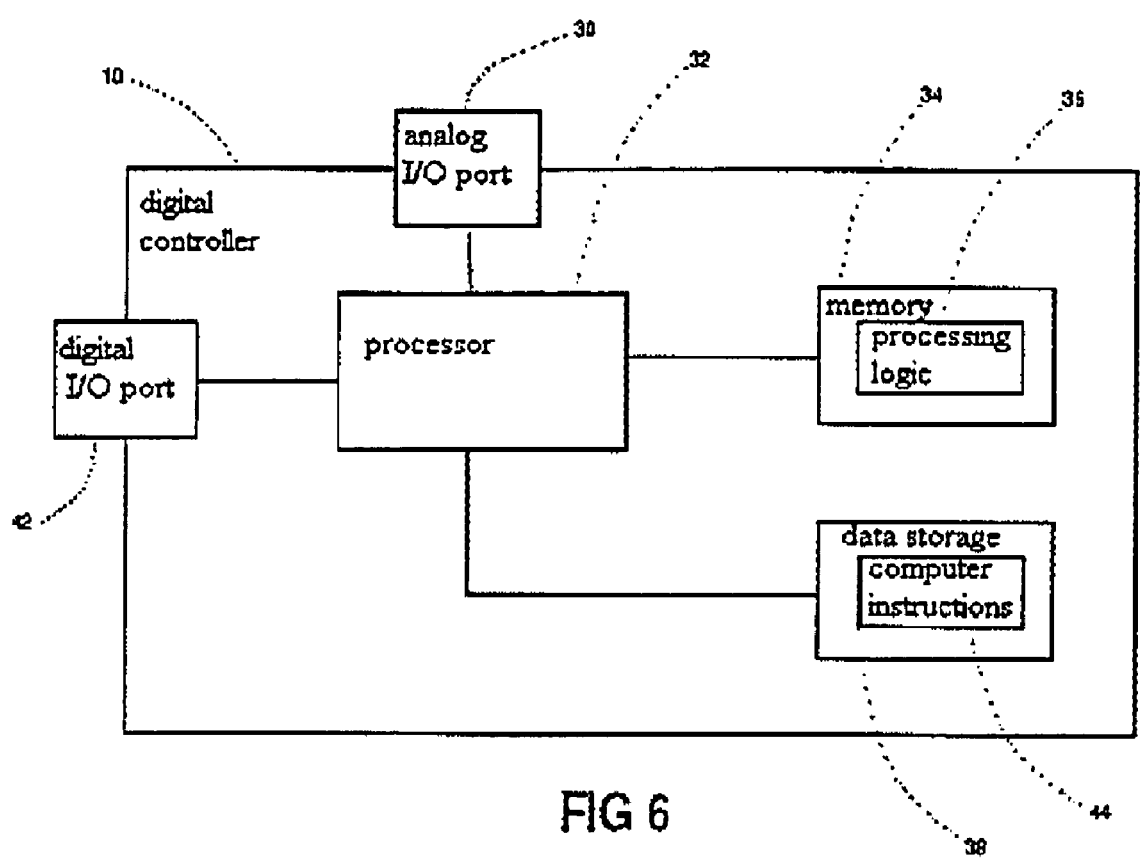
FIG. 6 depicts a digital controller usable in the battery pack control module.

FIG. 6 shows an embodiment of a digital controller 10, which can include one or more analog I/O ports 30, one or more digital I/O ports 42, a processor 32, and memory 34 with processing logic 36, and computer instructions 44 within data storage 38, or alternatively within memory 34 for directing the processor 32. The digital controller 10 can include at least one configuration table that optionally, can be a programmable table, adapted for storage in memory or data storage. Data storage 38 can be in communication with the processor 32 for storing the computer instructions 44.

The digital controller can be used to execute computer instructions which can monitor and measure the state of charge for the plurality of lithium ion cells or groups of lithium ion cells; monitor and measure current through the plurality of lithium ion cells, monitor and measure temperature of the plurality of lithium ion cells, monitor, initialize, and activate the analog controller, activate at least one disconnect circuit for safety between the plurality of lithium ion cells or groups of lithium ion cells; and activate at least one balancing circuit to achieve balance between the plurality of lithium ion cells or groups of lithium ion cells.

The digital controller is used to execute computer instructions for monitoring the state of charge of the lithium cells or groups of cells and removing at least a portion of the charge to achieve balance between the plurality of cells or groups of cells.

While these embodiments have been described with emphasis on the embodiments, it can be understood that within the scope of the appended claims, the embodiments might be practiced other than as specifically described herein.

What is claimed is:

1. A battery pack control module for balancing a plurality of cells or groups of cells connected in series, wherein the battery pack control module consists of:
   a. a controller assembly comprising an analog controller and a digital controller;
   b. a disconnect circuit, comprising a charge switch and a discharge switch connected in series, engaging the controller assembly and the plurality of cells or groups of cells connected in series;
   c. a pack sensing circuit comprising a member selected from the group consisting of means for measuring battery pack system module temperature, means for measuring battery pack system module current, means for measuring cell voltages, or combinations thereof; wherein the pack sensing circuit connects to the controller assembly and the plurality of cells or groups of cells connected in series;
   d. a balancing circuit comprising a shunt resistor connected to a by-pass switch, wherein the balancing circuit connects between the plurality of cells or groups of cells connected in series and engages the controller assembly; and
   e. computer instructions for instructing the controller assembly to control the disconnect circuit and the balancing circuit; and
   wherein the plurality of cells or groups of cells connected in series are balanced when the battery pack control module operates in a charging phase, a discharging phase, a quiescent phase, and a storage phase.

2. The battery pack control module of claim 1, wherein the digital controller further comprises at least one configuration table.

3. The battery pack control module of claim 2, wherein the at least one configuration table is programmable.

4. The battery pack control module of claim 1, further comprising at least one diode for preventing excessive voltage from developing across the controller assembly.

5. The battery pack control module of claim 4, wherein the at least one diode performs the function of a second diode.

6. The battery pack control module of claim 1, further comprising a second diode for balancing a plurality of battery pack system modules by discharging the plurality of battery pack system modules until a balance phase for the plurality of battery pack system modules is achieved.

7. The battery pack control module of claim 1, wherein the by-pass switch comprises a member selected from the group consisting of a semiconductor switch, a variable resistor, a mini-micro switch or combinations thereof.

8. The battery pack control module of claim 1, wherein a cell voltage is measured between cells, between groups of cells, or combinations thereof.

9. The battery pack control module of claim 1, wherein means for measuring battery pack control module temperature is external to the controller assembly.

10. The battery pack control module of claim 1, wherein the means for measuring battery pack control module current is external to the controller assembly.

11. The battery pack control module of claim 1, wherein the means for measuring cell voltages between cells, between groups of cells or combinations thereof is internal to the analog controller.

12. The battery pack control module of claim 1, wherein the digital controller comprises one or more analog I/O ports, one or more digital I/O ports, a processor, memory with processing logic and the computer instructions for instructing the controller assembly.

13. The battery pack control module of claim 12, further comprising data storage in communication with the processor for storing the computer instructions for instructing the controller assembly.

14. The battery pack control module of claim 1, wherein the computer instructions for controlling the controller assembly include instructions to direct the processor to connect the plurality of cells or groups of cells connected in series to the charger, to connect the plurality of cells or groups of cells connected in series to a load, to connect the plurality of cells or groups or cells connected in series to an application, or to disconnect the plurality of cells.

15. The battery pack control module of claim 1, wherein at least two groups battery pack system modules are connected together in series to form a battery pack system.

16. The battery pack control module of claim 1, wherein at least two groups of battery pack system modules are connected together in parallel to form a battery pack system.

17. The battery pack control module of claim 1, wherein at least four groups of battery pack system modules are connected together in both parallel and series to form a battery pack system.

18. The battery pack control module of claim 1, further comprising a voltage regulator for powering the controller assembly.

19. The battery pack control module of claim 16, wherein the voltage regulator is a DC programmable voltage regulator.

20. The battery pack control module of claim 1, wherein at least one of the plurality of cells or groups of cells is a lithium ion cell.

* * * * *